(12) United States Patent
Peng

(10) Patent No.: US 7,451,954 B1
(45) Date of Patent: Nov. 18, 2008

(54) SLIDING MECHANISM

(75) Inventor: Chi-Zen Peng, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/842,263

(22) Filed: Aug. 21, 2007

(51) Int. Cl.
*A47B 96/06* (2006.01)

(52) U.S. Cl. .................. 248/205.1; 248/920

(58) Field of Classification Search .......... 248/205.1, 248/346.01, 346.05, 917, 920; 403/59, 61; 361/681, 683
See application file for complete search history.

(56) References Cited

U.S. PATENT DOCUMENTS

| | | | |
|---|---|---|---|
| 6,034,866 A * | 3/2000 | Nobuchi et al. ............ | 361/681 |
| 7,369,882 B2 * | 5/2008 | Hwang et al. ............ | 455/575.1 |
| 2004/0174666 A1 * | 9/2004 | Brandenberg et al. ....... | 361/680 |
| 2004/0228076 A1 * | 11/2004 | Clapper .................... | 361/681 |
| 2006/0252471 A1 * | 11/2006 | Pan ........................ | 455/575.4 |
| 2007/0146977 A1 * | 6/2007 | Choi ........................ | 361/680 |
| 2008/0117573 A1 * | 5/2008 | IM et al. .................. | 361/680 |

FOREIGN PATENT DOCUMENTS

TW 1264652 5/1995

* cited by examiner

*Primary Examiner*—Ramon O Ramirez
(74) *Attorney, Agent, or Firm*—Workman Nydegger

(57) ABSTRACT

A sliding mechanism is applied to a computer device that has a first body and a second body. The sliding mechanism includes two fixed members, two sliding members, and two pushing members. The fixed members are disposed on the first body, and have an arc slide track respectively. The sliding members are disposed on the slide tracks respectively and joined to the second body. The pushing members are joined to the fixed members and the sliding members. When the sliding members are between critical positions of the slide tracks and one end, the pushing members normally push the sliding members towards a first end or a second end, so that the second body slides relative to the first body along the arc slide tracks.

8 Claims, 9 Drawing Sheets

SLIDING MECHANISM

BACKGROUND OF THE INVENTION

1. Field of Invention

The present invention relates to a sliding mechanism, and more particularly to a sliding mechanism applied to a PC with slidable cover.

2. Related Art

With the rapid development of science and technology, computer equipments have become an indispensable product in work or daily life, and computer products are gradually developed into microminiaturization. The portable electronic devices currently available in the market, such as ultra-mobile personal computers (UMPC), notebooks, tablet PCs, personal digital assistants (PDA), are developed towards the trend of "light, thin, short, and small", and convenient to carry, so as to greatly improve the convenience of for users who often travel around.

For example, the UMPC has a sliding screen design for the purpose of reducing the overall volume. The sliding screen may slide up with respect to the main body to expose the keyboard or control panel of the host according to actual requirements of use, or may slide close with respect to the main body, so as to form an integrated appearance of thin device.

Taiwan Patent No. I264652 discloses the screen slides with respect to the host along a sliding path parallel to the host. Since most of current screens are flat screens or liquid crystal screens, users cannot clearly view the contents displayed on the screens unless at a specific viewing angle. However, when a user is viewing the computer device lying on a desk, the screen is disposed horizontally, which is not consistent with the viewing angle of the user, so that the user has to adjust the viewing angle to read information displayed on the screen, which is not convenient in use.

In addition, if the user operates the computer device always in an incorrect gesture, the user may easily feel uncomfortable or pain at the head, neck or shoulder, and even have permanent damages.

The viewing angle of the screen of the conventional slider-type PC cannot be adjusted, which does not meet the actual requirements of use, and does not take the comfort of the user when using the computer into account.

SUMMARY OF THE INVENTION

In view of the above problems, the present invention provides a sliding mechanism, so as to solve the problem existing in the conventional slider-type PC is laid on the desk horizontally, and the screen is not consistent with the normal viewing angle of the user, so that the user cannot read the contents displayed on the screen conveniently.

The sliding mechanism of the present invention is applied to a computer device. The computer device includes a first body and a second body sliding relative to the first body. The sliding mechanism includes at least one fixed member, at least one sliding member, and at least one pushing member. The fixed member is disposed on the first body and has an arc slide track. The slide track has a first end, a second end, and a critical position between the first end and the second end. The sliding member is disposed on the slide track and joined to the second body, so as to allow the second body to slide relative to the first body along the slide track through the sliding member. The two ends of the pushing member are joined to the fixed member and the sliding member respectively. When the sliding member slides to a position between the first end and the critical position, the pushing member normally pushes the sliding member towards the first end, and when the sliding member slides to a position between the second end and the critical position, the pushing member normally pushes the sliding member towards the second end.

In the sliding mechanism according to the present invention, the second body is driven by the sliding member sliding along the arc slide track to slide open upwardly at an angle relative to the first body, so as to provide a preferable angle and comfort for the user to view the second body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The sliding mechanism of the present invention is applied to a computer device which likes a sliding PC, such as a UMPC, a notebook, a tablet PC, and a PDA. In the following detailed description of the present invention, the UMPC is taken as the most preferred embodiment of the present invention, and the accompanying drawings are only intended to make demonstrations and references, but not to limit the present invention.

Figure 1A:
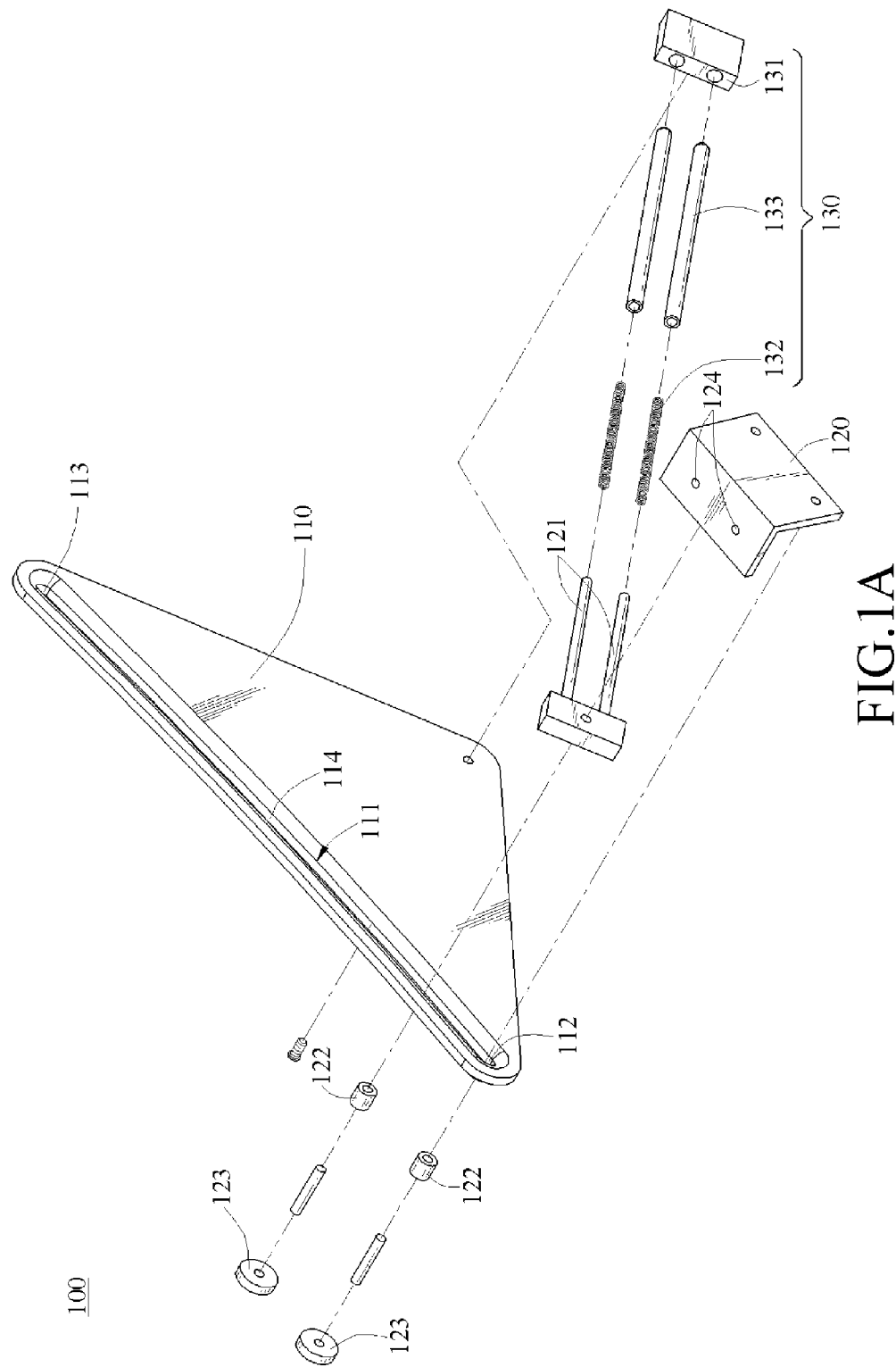
FIG. 1A is a perspective exploded view of the present invention.
Figure 1B:
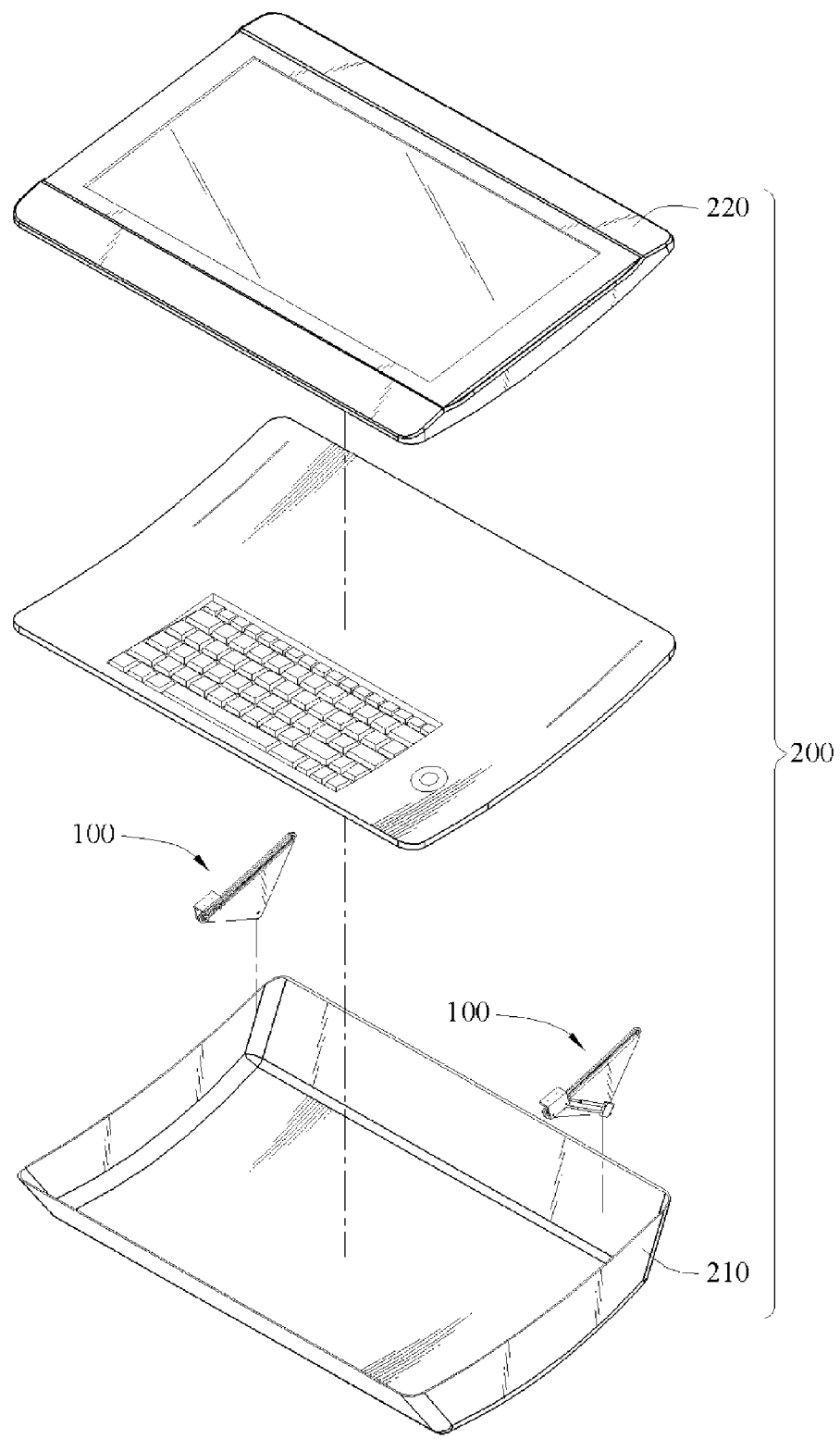
FIG. 1B is a perspective exploded view of the present invention.
Figure 1C:
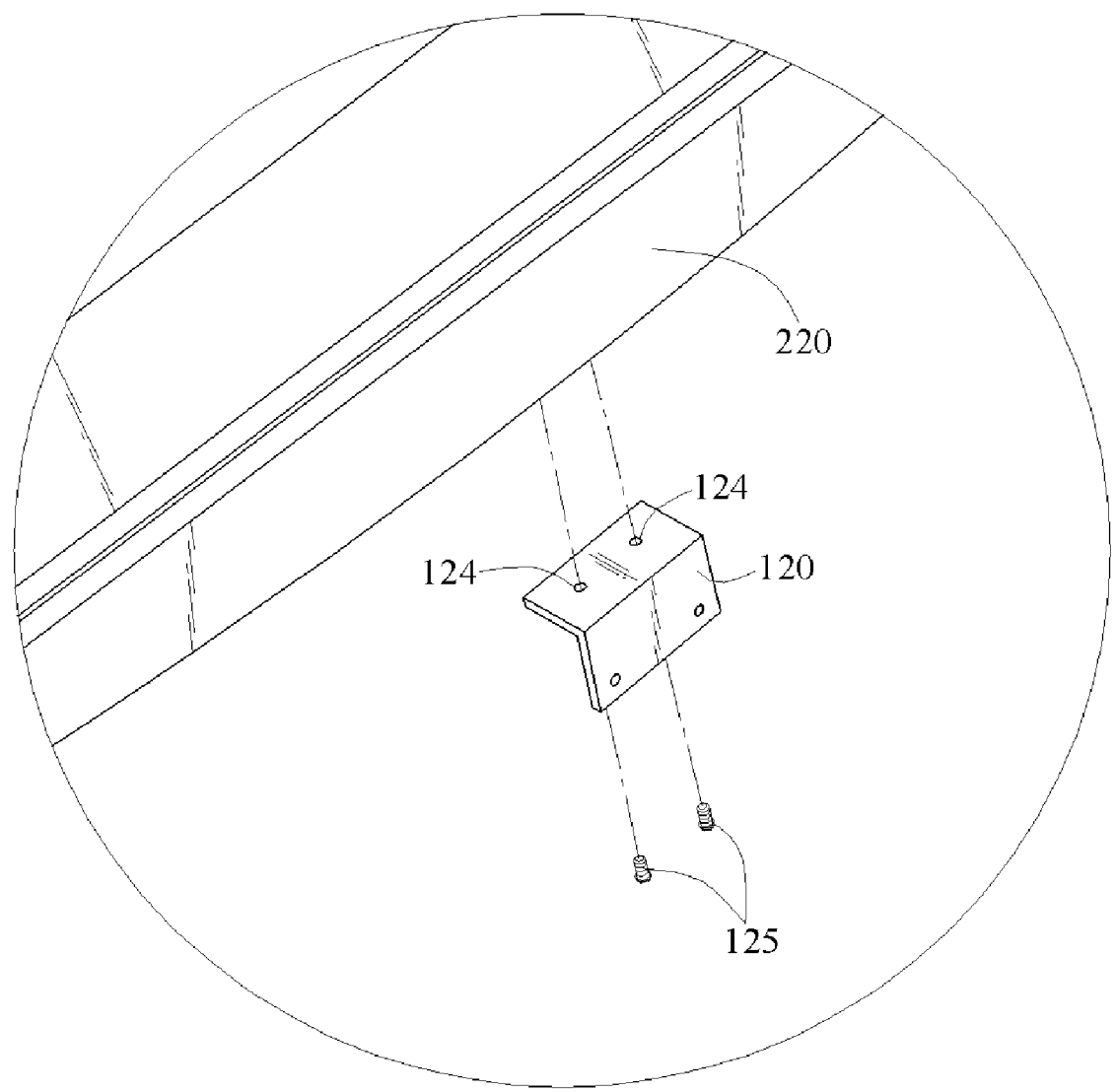
FIG. 1C is a perspective exploded view of the present invention.

Referring to FIGS. 1A, 1B, and 1C, the sliding mechanism 100 of the present invention is applied to a computer device 200. The computer device 200 has a first body 210 and a second body 220 sliding relative to the first body 210. The side surface of the first body 210 and the side surface of the second body 220 which attach with each other are arc surfaces. The first body 210 in the present invention is a host of the computer device 200, and the second body 220 is a sliding screen movably disposed on the host, for illustration of the embodiment of the present invention.

The sliding mechanism 100 includes two fixed members 110, two sliding members 120, and two pushing members 130. The two fixed members 110 are disposed on two opposite sides of the first body (i.e., the host) 210 correspondingly, and an arc slide track 111 is formed in the fixed member 110. The slide track 111 has a first end 112, a second end 113, and a critical position 114 between the first end 112 and the second end 113. If the first end 112 is used as an assumed reference point, the position of the second end 113 is higher than that of the first end 112. Therefore, a height difference is formed between the two ends 112 and 113.

The sliding members 120 are plate structures. Two sliding blocks 122 are disposed on one side of the sliding members 120, and mounted on the rail of the slide track 111. A stopper 123 is fitted on each sliding block 122 at one end opposite to the sliding members 120, so as to limit the sliding members 120 to slide on and not fall off the slide tracks 111. Each of the sliding members 120 has at least one fixing hole 124 formed in another side thereof, and is locked to the second body 220 (i.e., the screen) by a locking element 125, such as a bolt, passing through the fixing hole 124, so that the sliding members 120 are combined with the second body 220. The second body 220 may slide relative to the first body 210 at an inclined angle along the slide track 111 through the sliding members 120.

The pushing members 130 respective have a pivot portion 131 and a plurality of elastic elements 132. The pivot portions 131 are pivotally arranged on the fixed members 110, and two ends of each elastic element 132 are joined to the pivot portions 131 and the sliding members 120 respectively. The critical position 114 in the present invention is on the slide track 111 at a position with the shortest distance to the connection position of the pivot portion 131 and the fixed member 110. When the sliding members 120 slide to the critical position 114, the elastic elements 132 joined between the pivot portions 131 and the sliding members 120 is pushed by the sliding members 120 to be fully compressed, and the sliding members 120 assume a balance state at the critical position 114.

The elastic elements 132 are compression springs. In order to protect the elastic elements 132 from being twisted by an external force, and to make sure the elastic elements 132 work smoothly, a plurality of bushings 133 is further disposed on the pivot portion 131, and each of the bushings 133 has an accommodation space to accommodate the elastic element 132. A plurality of pins 121 are further disposed on the side of each sliding member 120 joined to the elastic elements 132, and the pins 121 are respectively inserted into the accommodation spaces of the bushings 133, so as to selectively compress the elastic elements 132.

Figure 2A:
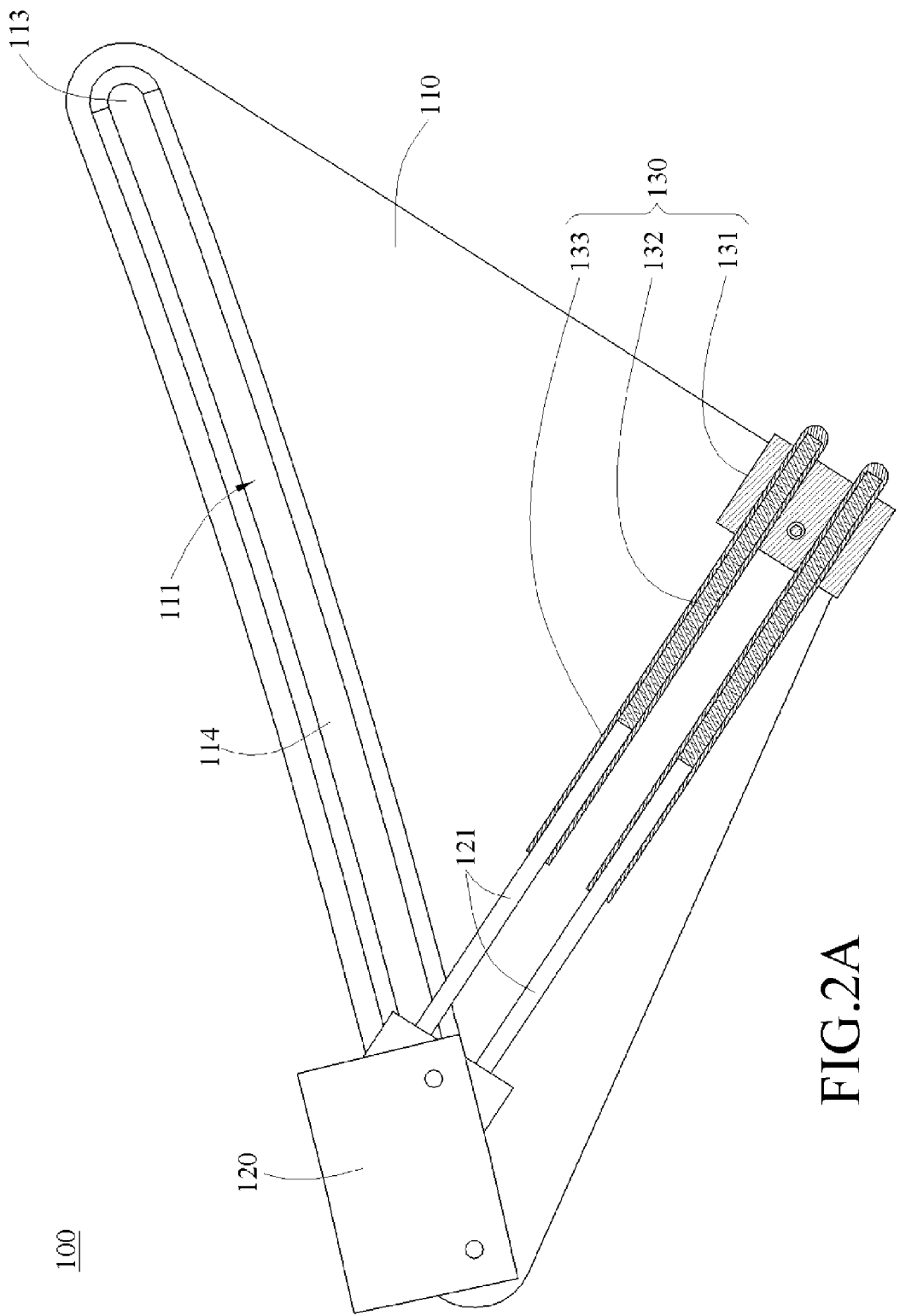
FIG. 2A is a cross-sectional side view of a sliding member at a first end according to the present invention.
Figure 2B:
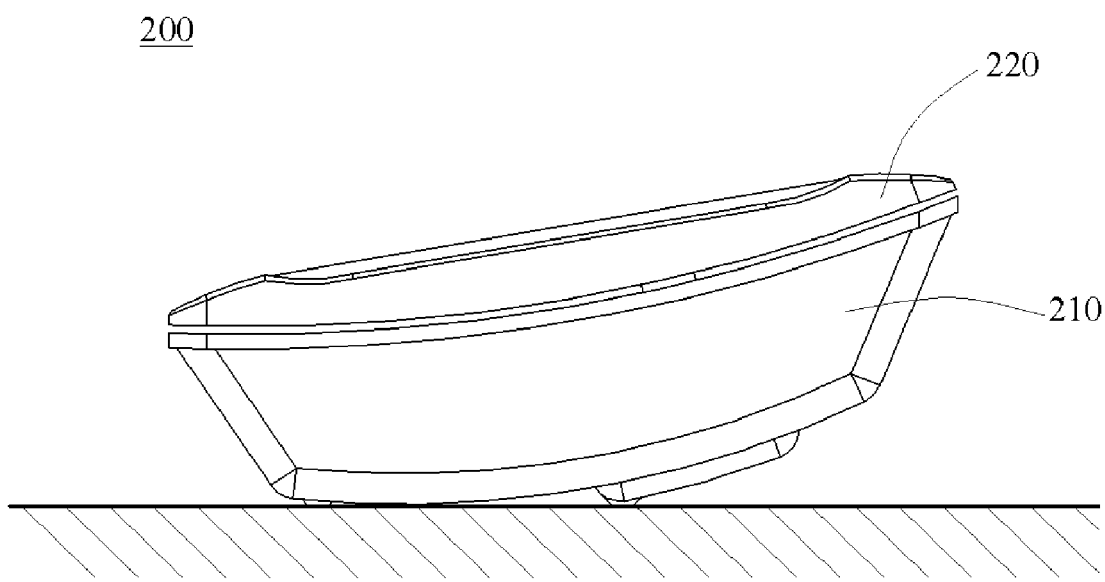
FIG. 2B is a side view of a second body at a close position according to the present invention.

As shown in FIGS. 2A and 2B, when the sliding member 120 is between the first end 112 and the critical position 114, the elastic elements 132 push the sliding member 120 towards the first end 112, and the elastic elements 132 normally push the sliding member 120 to retain it at the position of the first end 112 by a pivoting angle of the pivot portion 131 relative to the sliding member 120. The second body 220 is fully attached onto the first body 210 at a slightly inclined angle through the arc surface thereof attached onto the first body 210.

Figure 3A:
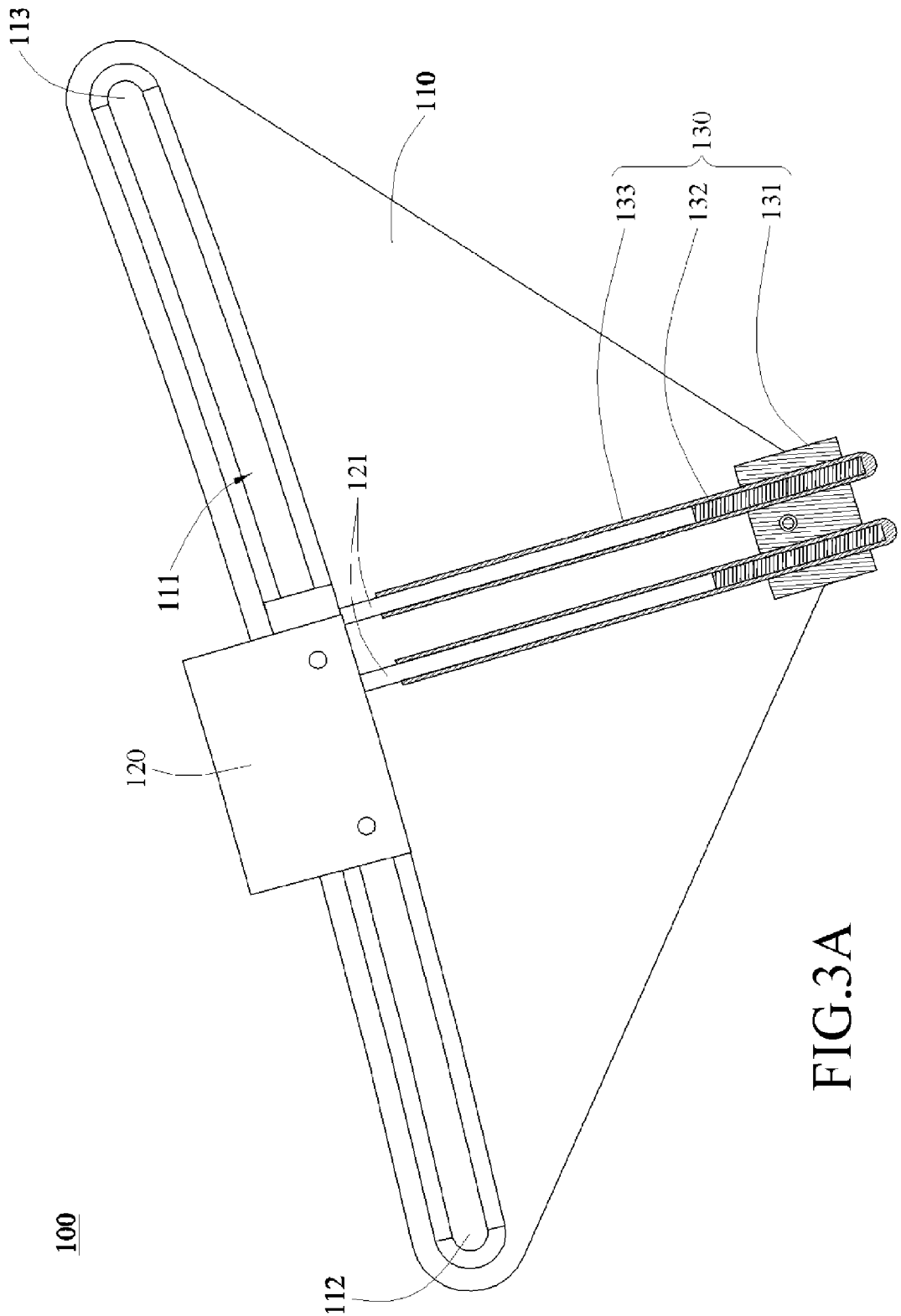
FIG. 3A is a cross-sectional side view of the sliding member at a critical position according to the present invention.
Figure 3B:
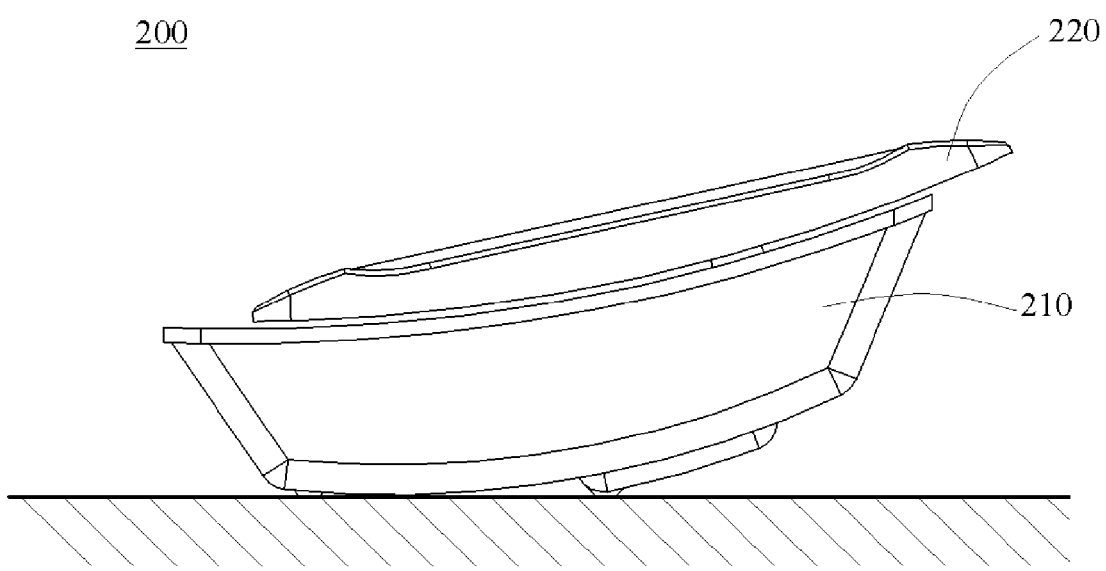
FIG. 3B is a side view of the second body at the critical position according to the present invention.

Referring to FIGS. 3A and 3B, when a user pushes the second body 220 to slide relative to the first body 210, the sliding members 120 joined to the second body 220 starts to slide from the first end 112 to the second end 113. When the sliding members 120 slide to the critical position 114 of the slide track 111 and maintain the balance state, the pivot portion 131 pivotally rotates relative to the sliding member 120, and the pins 121 inserted in the bushings 133 push the elastic elements 132 downwardly, so that the elastic elements assume the fully compressed state.

Figure 4A:
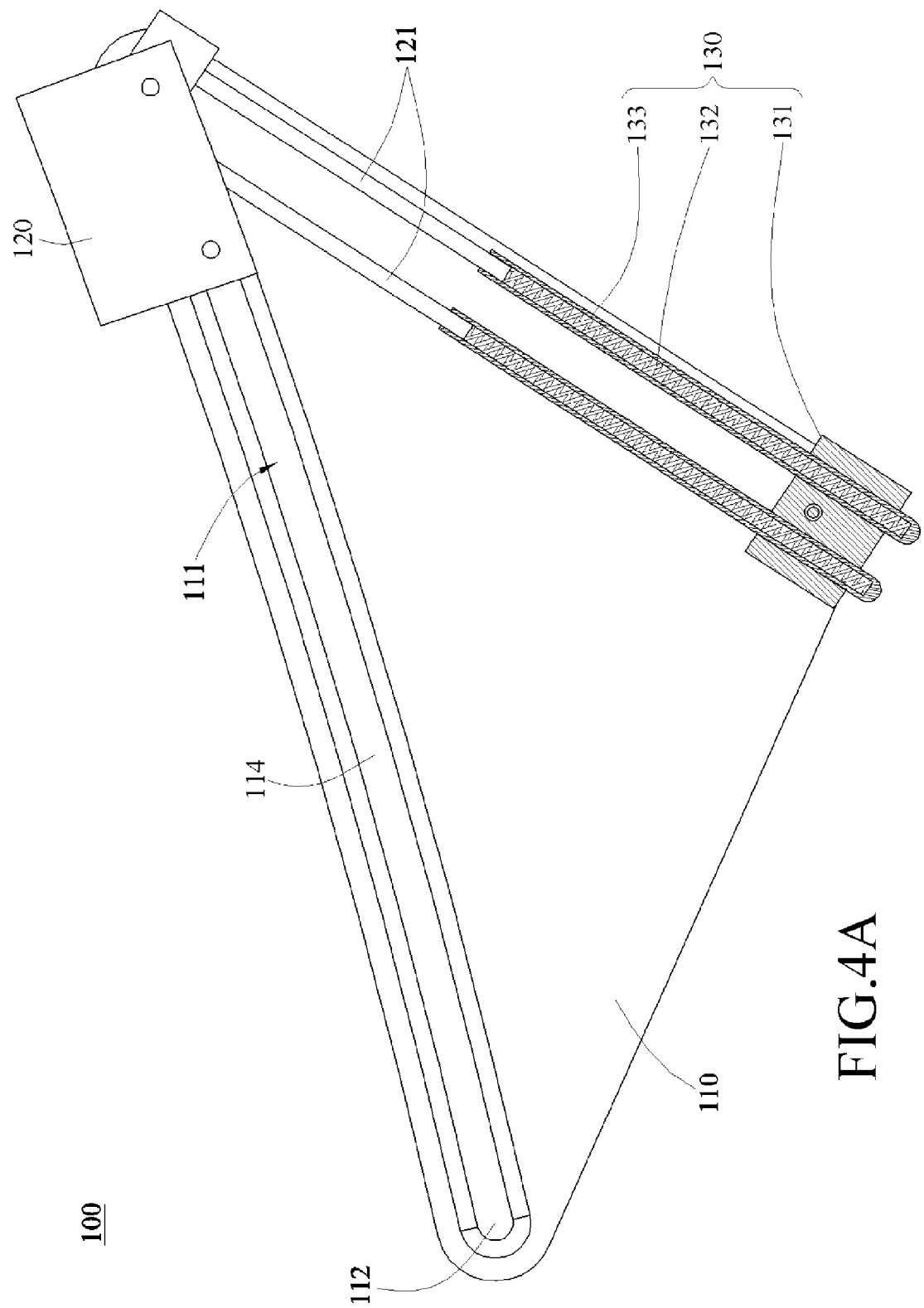
FIG. 4A is a cross-sectional side view of the sliding member at a second end according to the present invention.
Figure 4B:
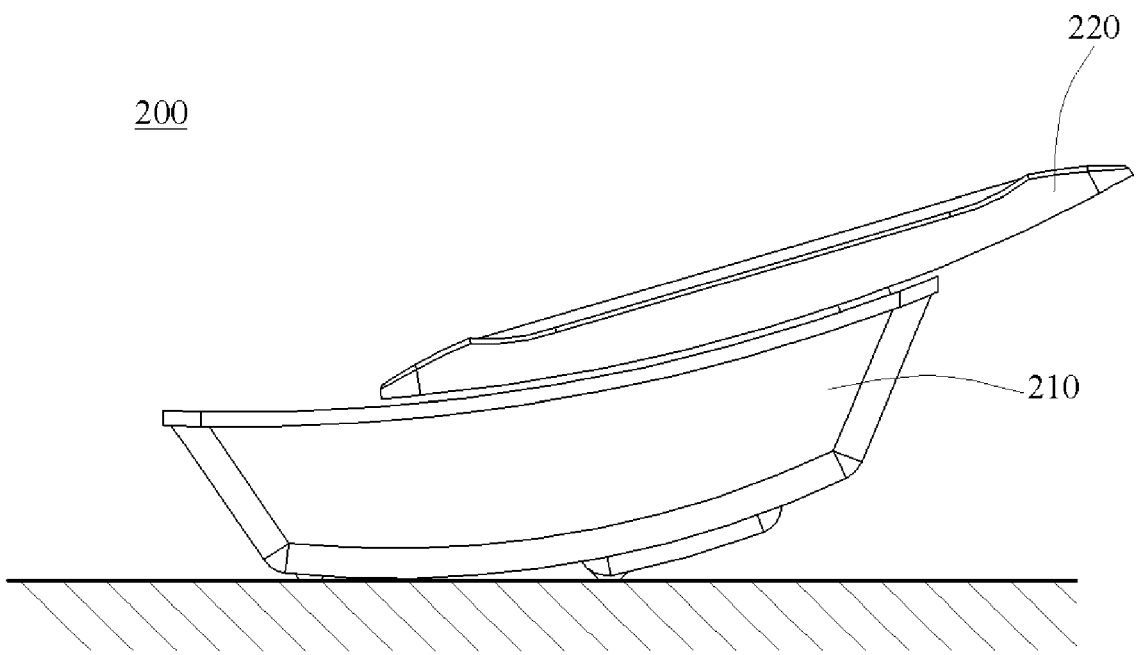
FIG. 4B is a side view of the second body at an open position according to the present invention.

As shown in FIGS. 4A and 4B, when the user continues to push the second body 220, the balance state of the sliding member 120 at the critical position 114 is released, and the sliding member 120 slides to the second end 113 of the slide track 111. When the sliding member 120 is between the second end 113 and the critical position 114, the compressed elastic elements 132 restore the normal state in which the elastic elements 132 are not compressed and generate an action force, so as to push the sliding members 120 to slide towards the second end 113. Furthermore, the elastic elements 132 normally push the sliding member 120 to retain it at the position of the second end 113 when the pivot portion 131 pivotally rotates to a direction corresponding to the sliding member 120. Since a height difference is formed between the first end 112 and the second end 113, the second body 220 is open relative to the first body 210 at a greater inclined angle, so that the user may operate and view the computer device 200 conveniently.

Compared with the conventional art, the screen of the computer device adopts an arc surface design, and is disposed on the host at an inclined angle, and may slide open upwardly at an inclined angle relative to the host by the sliding members sliding along the arc slide tracks, so that the user may view the computer device at a normal viewing angle and read the information displayed on the screed in a normal gesture, thereby greatly enhancing the comfort of the user when using the computer device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sliding mechanism, applied to a computer device, wherein the computer device has a first body and a second body sliding relative to the first body, the sliding mechanism comprising:

at least one fixed member, disposed on the first body, the fixed member has an arc slide track, and the slide track has a first end, a second end, and a critical position between the first end and the second end;

at least one sliding member, disposed on the slide track, the sliding member is joined to the second body, and the second body slides relative to the first body along the slide track through the sliding members; and at least one pushing member, having two ends joined to the fixed member and the sliding member respectively, wherein when the sliding member is between the first end and the critical position, the pushing member normally pushes the sliding member towards the first end, and when the sliding member is between the second end and the critical position, the pushing member normally pushes the sliding member towards the second end.

2. The sliding mechanism as claimed in claim 1, wherein the pushing member has a pivot portion and at least one elastic element, the pivot portion is pivotally arranged on the fixed member, two ends of the elastic element are joined to the pivot portion and the sliding member respectively, the pivot portion pivotally rotates with the sliding movement of the sliding member, and the elastic element is compressed by the sliding movement of the sliding member, so as to normally push the sliding member towards the first end or the second end.

3. The sliding mechanism as claimed in claim 2, wherein the pivot portion further comprises at least one bushing having an accommodation space therein to accommodate the elastic element.

4. The sliding mechanism as claimed in claim 3, wherein the sliding member further has at least one pin at one side thereof joined to the elastic element, and the pin is inserted in the accommodation space to selectively compress the elastic element.

5. The sliding mechanism as claimed in claim 2, wherein the elastic element is a compression spring, when the sliding member is between the first end and the critical position, or between the second end and the critical position, the compression spring assumes a compressed state, and when the sliding member is disposed the first end or the second end, the compression spring assumes a normal state.

6. The sliding mechanism as claimed in claim 1, wherein the sliding member further has at least one sliding block and at least one stopper, the sliding block is mounted on the slide track, and the stopper is fitted on the sliding block at the end opposite to the sliding member, so as to limit the sliding member to slide on the slide track.

7. The sliding mechanism as claimed in claim 1, wherein the critical position is on the slide track at a position with a shortest distance to a connection position of the pushing member and the fixed member.

8. The sliding mechanism as claimed in claim 1, wherein the sliding member has at least one fixing hole, and the sliding member is combined with the second body by at least one locking element passing through the fixing hole.

* * * * *